United States Patent Office 3,428,589
Patented Feb. 18, 1969

3,428,589
ELECTROCOATING COMPOSITIONS COMPRISING AROMATIC AMINE AMIDATED DRYING OIL COPOLYMER-MALEIC ANHYDRIDE ADDUCTS
Carlton E. Coats, Savage, Minn., assignor to Ashland Oil & Refining Company, Ashland, Ky., a corporation of Kentucky
No Drawing. Filed Sept. 30, 1965, Ser. No. 491,889
U.S. Cl. 260—23.7                     6 Claims
Int. Cl. C08g *20/26;* C09d *5/02*

ABSTRACT OF THE DISCLOSURE

A water-dispersible resinous composition is provided for use in the electrodeposition of coatings thereof onto metallic surfaces basically composed of an adduct of a drying oil or copolymer thereof, and a dicarboxylic anhydride of which the carboxyl groups contained by said adduct are partially amidated with an aromatic amine and the balance of said groups neutralized to a partial extent with an alkanolamine.

---

This invention relates to a resin composition useful as a vehicle in coating compositions. In another aspect, it relates to a water dispersible, partially neutralized resin composition useful as a vehicle in the electrocoat painting of metallic surfaces such as automobile bodies. In a further aspect, it relates to a process for the electrocoat painting of metallic articles with an improved electrocoat painting bath.

In recent years, there has been a great deal of research and commercial activity in the development of water-dispersible resins useful as vehicles in coating compositions. Though a number of such resin systems have been developed, only a limited number have proven satisfactory for many coating applications. Many of such resin systems, when used in the electrocoat painting (or electrodeposition) of metallic substrates, do not have high voltage capability and/or do not result in films with good properties. When such resins are used at high voltages, e.g., 250–500 volts, in an attempt to get high throwing power, the applied resinous film often sags, runs, ruptures or breaks down and develops holes when the film is baked, and thus such resins do not have high voltage capability. The term "throwing power," which is commonly utilized in the field of electrochemical deposition processes, denotes the property by means of which each of the different zones of the electrode to be coated by a coating receives essentially the same density of deposited product, even if these zones are located at considerably varying distances from the other electrode. This property is of principal importance for industrial applications, in which the article to be coated with a coating contains spaces, interstices, cracks and other imperfections which will only be partially coated, if at all, if the throwing power of the bath utilized does not have a suitable value. The higher the throwing power of the system, the greater the extent of deposition. The term "high voltage capability" is understood in the art, and used herein, to mean the ability of the resin system to deposit at high voltages a film which has integrity (i.e., not ruptured) and a servicable thickness (e.g., 0.5 to 2 mils); a resin system which does not have this high voltage capability manifests such inability by extreme gassing, film rupture, excessive film thickness, and rapid rise in amperage during electrocoating.

One very significant resin system which has been developed and has excellent throwing power and other good film properties is that disclosed in copending application, Ser. No. 424,825, filed Jan. 11, 1965. The resin system disclosed and claimed therein is a polycarboxylic acid resin product prepared by mixing (1) an alpha, beta-ethylenically unsaturated material, such as maleic anhydride, (2) a copolymer of a drying oil and a polymerizable, ethylenically unsaturated monomer, such as cyclopentadiene, and (3) a low molecular weight material, such as an aliphatic alcohol, and heating the mixture until the resulting polycarboxylic acid resin product has a desirably high viscosity. This polycarboxylic acid resin is partially neutralized to form a water dispersible resin solution which can be diluted with water to form a solution or dispersion having admirable electrocoating properties, particularly high voltage capability. However, while these desirable results can be obtained with this resin, it is generally necessary that the coating composition or bath be prepared within a short time after preparation of the polycarboxylic acid resin because said high voltage capability decreases or deteriorates if the polycarboxylic acid resin product is allowed to age at ambient conditions, e.g., such as encountered during normal storage, for more than five or ten days before the product is neutralized and dispersed in water.

Another significant resin system which was recently developed and which appears to have very good properties, e.g., throwing power and high voltage capability, is that disclosed in a copending application, Ser. No. 489,073, filed Sept. 21, 1965. The resin system disclosed and claimed therein is a blend of resins which comprises (1) as a major component, a polycarboxylic acid resin product as prepared above in Ser. No. 424,325 and (2) as a minor component, a polycarboxylic acid anhydride resin prepared by heating (a) an alpha, beta-ethylenically unsaturated material and (b) an oil selected from the group consisting of drying oils and modified drying oils until the resulting resin has a desirably high viscosity. This resin system has excellent storage stability, i.e., it suffers little or no decrease in high voltage capacity when stored for five or ten days before being neutralized and dispersed in water. However, this system requires at least a 24-hour aging period before it can be diluted with water and used as an electrocoating bath.

Accordingly, an object of this invention is to provide a process for preparing improved partially-neutralized polycarboxylic acid anhydride resins. Another object is to provide improved polycarboxylic acid anhydride resins with high viscosities which are stable and which can be used, for example, as vehicles or components in film-forming coating compositions. Another object is to provide improved polycarboxylic acid anhydride resins which have high voltage capabilities (as well as low voltage capabilities) when used in electrocoat painting. Another object is to provide an improved process for electrocoat painting of electrically conductive substrates, such as metallic articles and the like, using such polycarboxylic acid resins as vehicles. Further objects and advantages of this invention will become apparent to those skilled in the art from the following description and appended claims.

Briefly, we have discovered that improved polycarboxylic acid anhydride resins can be prepared by heating (1) a dry oil, a modified drying oil or a mixture thereof, and (2) and alpha, beta-ethylenically unsaturated dicarboxylic acid anhydride, said heating being continued until a polycarboxylic acid anhydride resin product (i.e., an adduct) with a desirably high viscosity is obtained. The polycarboxylic acid anhydride resin product is then reacted with an organic aromatic primary or secondary amine, having from 1 to 20 carbon atoms, preferably 1 to 10 carbon atoms. A tertiary amine will not work, since an active hydrogen ion is required for the reaction. The polycarboxylic acid anhydride resin product obtained has a desirably high viscosity which remains stable on standing, and the resin product can be used as a water-dispersible vehicle in coating compositions, especially in electrocoating baths where the resin has been found to have very good electrocoating properties, e.g., high throwing power, good dispersibility, excellent pumping stability, and excellent intermediate voltage capability, and produces coatings with very good surface integrity, water-insolubility, smooth films, good salt-spray resistance and hard surfaces.

In the reaction of the polycarboylic acid anhydride resin product with the aromatic amine, the following represents an example of the reaction which usually occurs:

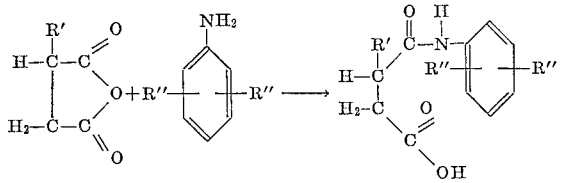

wherein R' represents the drying oil portion of the adduct and R'' is hydrogen or alkyl. As can be seen from the structural representation of the reaction, the adduct is split by the reaction with the aromatic amine, resulting in the formation of one amide group and one free acid group per mole of amine reacted. The reaction of the aromatic amine with a polycarboxylic acid anhydride resin is quite unlike the reaction of aliphatic amines therewith, i.e., in the case of aliphatic amines, two moles of aliphatic amine per mole of acid anhydride resin are required and one amide group and one amine salt are formed per two moles of amine reacted. The following represents an example of the reaction of an aliphatic amine with a maleic adduct:

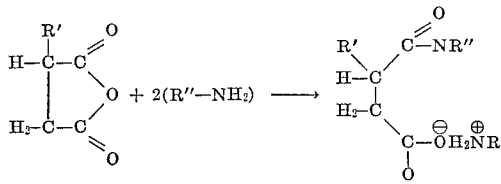

wherein R' represents the drying oil portion of the adduct and R'' is hydrogen or an alkyl group. As can be seen, two moles of aliphatic amine are required to form one amide group and one amine salt group. Moreover, one acid group is neutralized or transformed into an acid-amide for every mole of amine reacted.

In the reaction of polycarboxylic adduct product with aromatic amine, the formation of amide is dominant and substantially no salt will be formed unless an excess of amine is reacted. However, when an aliphatic amine is reacted with the polycarboxylic acid anhydride adduct product, salt formation occurs simultaneously with acid-amide formation (see Belgian Patent No. 637,005).

The polycarboxylic acid anhydride resin which is reacted with the organic aromatic amine to prepare the improved coating vehicle of this invention is a polycarboxylic acid anhydride resin devoid of any hydroxyl groups. Further, the polycarboxylic acid anhydride resin has at least about 50 percent, preferably about 75 percent, of its carboxyl groups in the form of carboxylic acid anhydrides. Any of the resins disclosed in the following U.S. patents can be used provided that their anhydride groups have not been split: U.S. Patents Nos. 2,188,883, 2,188,885, 2,188,- 888, 2,262,923, 2,678,934, 2,285,646, 2,820,711, 2,286,466, 2,188,890, 2,298,914, 2,502,606, 2,634,256, 2,369,683, 2,384,846, 2,731,481 and 3,098,834, South African Patents Nos. 62-3314 and 62-525 and Great Britain Patents Nos. 933,175 and 407,957.

According to the procedure which is used to prepare the vehicle of this invention, the alpha, beta-unsaturated reactant (e.g., maleic anhydride) is first heated and reacted with the drying oil or chemically-modified drying oil (e.g., a copolymer of cyclopentadiene and linseed oil) to form a resinous polycarboxylic acid anhydride adduct. This adduct is then heated and reacted with an aromatic primary or secondary amine, the amount of said amine being about 40 to 100 percent of the stoichiometric amount needed to react with the anhydride, preferably about 50 to 80 percent. This reaction forms amide groups on 40 to 100 percent, preferably 50 to 80 percent, of the anhydride groups present in the polycarboxylic acid anhydride adduct product, depending upon the amount of amine reacted.

The adduct-forming reaction is conducted at a temperature in the range of 250° to 500° F., preferably 300° to 450° F., for a few minutes to several hours, usually 15 minutes to 6 hours, depending upon the particular reactants used, the amounts thereof, whether the reaction is carried out batch-wise or continuously, and depending upon the viscosity and acid value desired in the resinous polycarboxylic acid anhydride adduct product. The adduct-forming reaction is usually carried out at atmospheric pressure, though super-atmospheric pressure can be used. Generally, the reaction conditions chosen will be such as to produce an adduct product having an acid value in the range of 30 to 250, preferably in the range of 50 to 150, with a viscosity (measured on a sample diluted to 70 weight percent non-volatile solids with mineral spirits) in the range of 3 to 50 stokes.

The heating of the adduct with the aromatic amine is carried out under conditions sufficient to obtain a polycarboxylic acid resin product without gelation of the reaction mixture or product. The reaction is necessary in order that the resulting resin may be applicable in the electrocoat painting process. Further, the reaction with the aromatic amine increases the viscosity of the adduct. The adduct is, in effect, neutralized by this reaction to 10 to 60 percent, usually 20 to 50 percent, and most preferably about 25 to 40 percent of its acidity (i.e., this proportion of the total carboxyl groups is converted to amides). Generally, the reaction of the adduct with the aromatic amine is conducted at a temperature in the range of 50° to 200° F., preferably about 130° to 170° F., for a few minutes to several hours, usually 15 minutes to 3 hours. The reaction is usually carried out at atmospheric pressure, though super-atmospheric pressure can be used. Generally, the reaction conditions chosen will be such as to produce a resin product having an acid value of 30 to 250, preferably in the range of 50 to 150, with a viscosity (measured on a sample diluted to 70 weight percent non-volatile solids with tertiary butanol) in the range of 15 to 300 stokes.

Polycarboxylic acid anhydride resin systems which are particularly useful are those drying oils, including semi-drying oil, particularly the natural glycerides, coupled or reacted with an alpha, beta-ethylenically unsaturated dicarboxylic acid anhydride or acid thereof which can be converted to anhydride. Generally, the drying oil or semi-drying oil which can be used to prepare the polycarboxylic acid anhydride component will be a vegetable oil such as cottonseed oil, corn oil, soybean oil, safflower oil, sunflower oil, oiticica oil, tung oil, rapeseed oil, linseed oil, perilla oil, poppyseed oil, tall oil triglyceride, dehydrated castor oil, blown castor oil, etc., and fish oils such as herring oil, menhaden oil, sardine oil, codfish oil, whale oil, and the like, including mixtures thereof. These oils are unsaturated triglycerides of fatty acids generally having 10 to 24 carbon atoms per molecule. The term "drying oil" is understood to mean, herein, both those oils which the art considers as drying oils and semi-drying oils. Generally these drying oils will have an iodine value of 50 to 150 or more. The drying oils will generally amount to 50 to 95 weight percent, preferably 60 to 95 weight percent, of the polycarboxylic acid anhydride resin.

The modified drying oil which can be used in this invention is one which has an iodine value greater than 80 and generally less than 250, an acid value less than 10, and an hydroxyl value not greater than 10, preferably not greater than 5. These modified oils can be prepared by copolymerizing a drying oil with a polymerizable, ethylenically-unsaturated monomer, such as cyclopentadiene, styrene, 1,3-butadiene, and acrylic acid. The term "modified-drying oil" is used herein as meaning unsaturated triglycerides of fatty acids generally having 10 to 24 carbon atoms per molecule and as inclusive of what are known in the art as semi-drying and drying oils. Suitable drying oils which can be used for this purpose representatively include vegetable oils such as cottonseed oil, corn oil, soybean oil, safflower oil, sunflower oil, oiticica oil, tung oil, rapeseed oil, linseed oil, perilla oil, poppyseed oil, tall oil, dehydrated castor oil, blown castor oil, etc., and fish oil such as herring oil, menhaden oil, codfish oil, whale oil, and the like, including mixtures thereof. The free unsaturated fatty acids having 10 to 24 carbon atoms per molecule can also be used and are included in the term drying oil as used herein. Usually, where unsaturated triglycerides of fatty acids are used, some minor amount of free fatty acids will be present. The drying oil will generally amount to 50 to 95 weight percent, preferably 60 to 95 weight percent, of the modified drying oil or total monomers (i.e., the combined weight of the drying oil and the copolymerizable monomers such as cyclopentadiene).

The polymerizable, ethylenically unsaturated monomers which can be used to chemically modify the drying oils representatively include: alicyclic conjugated diene hydrocarbons, like those disclosed in U.S. Patent No. 2,399,179, preferably having 5 to 8 ring carbon atoms, such as cyclopentadiene and its lower homopolymers, 1,3-cyclohexadiene, 2,6 - dimethyl - 2,4,6 - octatriene, and the like; vinylidene or vinyl substituted monomers, like those disclosed in U.S. Patents Nos. 2,601,273 and 2,850,469, such as styrene, alpha-methyl styrene, vinyl toluene, divinylbenzene, acrylamide, vinyl chloride, acrylic acid, methyl methacrylate, vinylacetate, acrylonitrile, vinyl methyl ketone, vinyl methyl ether, allyl alcohol, allyl acetate, diallyl maleate, allyl acrylate, and the like; and conjugated dienes, preferably having 4 to 8 carbon atoms, such 1,3-butadiene, isoprene, 2-methyl-1,3-butadiene, 2,3-dimethyl-1,3-butadiene, piperylene, and chloroprene; and the like, including mixtures thereof. The preferred modified drying oils used are the cyclopentadiene-modified drying oils or copolymers (see U.S. Patents Nos. 2,397,-600, 2,397,601, 2,399,179 and 2,443,044 issued to H. L. Gerhardt) produced by mixing the drying oils with cyclopentadiene and heating (e.g., at 200° C.) to polymerize the mixture. Representative examples of cyclopentadiene-modified drying oils which are especially useful in forming the adduct include copolymers of soybean oil, linseed oil, tung oil, or dehydrated castor oil, and mixtures thereof, with cyclopentadiene. Commercially available cyclopentadiene-modified drying oils which can be used in this invention representatively include Admerol 75, which has an iodine value of 120 to 150, an acid value of less than 3, and an hydroxyl value of 2 to 10. These cyclopentadiene-modified drying oils are presently preferred because resins made therefrom according to this invention have very good high voltage electrocoating capabilities and produce films or coatings with very good properties, such as surface integrity and corrosion resistance.

As used herein, the terms "drying oils" and "modified drying oils" include drying oils, modified drying oils, semi-drying oils and modified semi-drying oils having iodine values of 50 to 250.

The term "alpha, beta-ethylenically unsaturated dicarboxylic acid anhydride," unless indicated otherwise, includes the half-esters of the acids and the acids themselves. These unsaturated materials representatively include maleic acid, fumaric acid, itaconic acid, acrylic acid, sorbic acid, mono-butyl maleate, maleic anhydride, itaconic anhydride, and the like, a class of compounds well known in the art. The preferred alpha, beta-unsaturated material is maleic anhydride. Where the alpha, beta-unsaturated material used is an acid or ester, such material is converted during the course of reaction to the anhydride, and where in this specification and in the claims the anhydrides are referred to as a class, it should be understood that such reference includes the acid and ester precursors thereof. Generally, the amount of alpha, beta-unsaturated material used in forming the resin of this invention will be from 5 to 45 weight percent, preferably 5 to 20 weight percent, of the total weight of resin-forming reactants (i.e., the combined weight of the modified drying oil, alpha, beta-unsaturated material, and low molecular weight material).

The aromatic amines which are heated with the polycarboxylic acid anhydride adduct to partially neutralize the adduct and form acid-amides can be any of the class of primary and secondary aromatic amines. Generally the aromatic amines are those having from 1 to 20 carbon atoms, preferably from 1 to 10 carbon atoms. They can be substituted with non-interfering substituents such as nitro groups and halogens, e.g., chlorine, bromine, iodine and fluorine. Preferably, the aromatic amine is a primary aromatic mono-amine having the nitrogen of the amino group connected by a single bond to a carbon in the chain of a phenyl group, and having 1 to 10 atoms. A particularly preferred class of primary aromatic mono-amines are those having the characteristic structure:

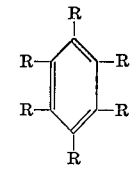

wherein one R is amino and the other R groups are selected from the group consisting of hydrogen and alkyl of 1 to 5 carbon atoms, preferably methyl. Examples of preferred aromatic amines are aniline, toluidene, xylidine, methyl aniline, ethyl aniline, and diphenyl amine. Other non-limiting examples of aromatic amines which are suitable for this invention are nitroaniline, phenylene diamine, anisidene, chloroaniline, bromoaniline, 2,4,6-trichloroaniline, 2,4,6-tribromoaniline, benzidene and dianisidine. I prefer to use water-soluble amines which will volatilize from the uncured films of my resins at temperatures below 375° F.

When the desired viscosity is reached in the adduct-forming reaction, the reaction can be terminated by cooling the reaction mixture to stop the viscosity increase or by quenching the reaction mixture with a polar solvent, such as a tertiary monohydric aliphatic alcohol, such as tertiary-butanol. The quenching media must be non-reactive with the anhydride resin and, further, is preferably water-soluble. Usually, the solvent will amount to 15 to 40 percent, preferably 20 to 30 percent, by weight of the resin solids in said resin product, the preferred solvent being an inert, tertiary monohydric aliphatic alcohol which is water-soluble.

To prepare the vehicle dispersion which can be diluted with water to form the electrocoating bath of this invention, the partially-neutralized polycarboxylic acid anhydride resin product is dispersed in an alkanolamine. The term "alkanolamine," as used herein, means an amine wherein nitrogen is attached directly to the carbon of an alkyl alcohol. The alkanolamine further neutralizes the partially-neutralized resin product to form a neutralized dispersion which can be diluted to form the improved electrocoating bath of this invention. This neutralization is required to render the resin system water-soluble since no amine salt was formed in the reaction with the aromatic amine. The amount of alkanol amine which is used to disperse the partially-neutralized adduct is from 30 to 80 percent of the amount of amine necessary to completely neutralize the partially-neutralized resin product. This amount can be determined, for example, by titration with KOH to determine the free carboxy groups and unreacted anhydride groups left in the partially-neutralized adduct. For example, when 70 percent of the stoichiometric amount of aromatic amine is reacted with the polycarboxylic acid anhydride resin, approximately 35 percent of the acidity of the resin is neutralized; thus, 65 percent of the acidity remains to be neutralized. Accordingly, if an alkanolamine is added in an amount equal to 60 percent of the amount necessary to completely neutralize the remaining acidity in the resin, some 39 percent of the acidity of the original adduct is further neutralized, giving a product which has been 74 percent neutralized. A vehicle dispersion which has been neutralized to this extent provides, contrary to pre-existing teachings in the art, an excellent electrocoating bath when diluted with water.

Representative alkanolamines which can be used to further neutralize the partially-neutralized polycarboxylic acid anhydride resin include the primary, secondary and tertiary alkanolamines, preferably having from 1 to 20 carbon atoms, such as mono-, di- and triethanolamines, mono-, di- and triisopropanol amines, hydroxylamines, ethanolamines, butanolamines, octonolamines, N-methyl ethanolamines, n-aminoethyl ethanolamines, and the like, including mixtures thereof. Preferably, a monohydroxy alkanolamine in which the alkyl group or groups have 1 to 5 carbon atoms is used. This neutralization destroys or splits the remaining acid anhydride groups remaining in the resin after the aromatic amine split and causes the formation of corresponding acid salts. Preferably, the alkanolamines used in this step of the invention are the water-soluble, primary, secondary and tertiary aliphatic hydroxy amines, such as diethanolamine and diisopropanol amine.

In employing the vehicle of this invention in electrocoating, I prefer to use those polycarboxylic acid anhydride resins produced according to this invention with acid values of 30 to 250 and neutralize these resin blends with an amount of alkanolamine, such as diethanolamine, sufficient to neutralize 30 to 80 percent, preferably about 40 to 60 percent, of the remaining theoretical acid groups in the resin blend and form a partially-neutralized vehicle dispersion. The vehicle dispersion has a non-volatile content of 20 to 60 weight percent, preferably about 35 to 50 weight percent.

Advantageously, the partially-neutralized vehicle dispersion is immediately pigmented and diluted with sufficient water to form an electrocoating bath having a non-volatile solids content of 1 to 35, preferably 5 to 15, weight percent.

Both clear and pigmented coating compositions, e.g., paints, varnishes, enamels, based on these resin blends can be prepared and can be applied by brushing, rolling, spraying and dipping, though they are especially useful in electrocoating electrically conductive substrates, such as metallic articles. The coatings can be air-dried or baked, depending on the end use.

The resin blends of this invention can be pigmented with conventional paint grinding equipment, e.g., pebble and roller mills. A minor amount of my resin blend or either of the two resin components can be mixed with the pigment as a grinding aid in the preparation of the pigment dispersion. For example, the pigment and a portion of a vehicle can be ground together to form a paste, which is then blended with the remaining portion of the vehicle to produce a coating composition. Pigments (and/or fillers) which can be used representatively include yellow iron oxide, red iron oxide, white lead, zinc oxide, rutile titanium dioxide, magnesium oxide, chromium oxide, antimony oxide, lead chromate, zinc chromate, lithopone, barium sulfate, calcium carbonate, magnesium silicate, aluminum silicate, magnesium carbonate, strontium chromate, silica mica, pumice, bentonite, China Clay, diatomite, talc, blanc fixe, carbon black, toluidine red, chromium yellow, phthaloazamine blue, and the like, including mixtures thereof. Dyes or tints can also be used. Other conventional additives can also be incorporated into the coating composition, such as driers (e.g., zinc, cobalt or magnesium naphthenate), anti-oxidants (e.g., orthoamyl cresol), wetting agents (e.g., petroleum sulfonates), optical brighteners, ultraviolet screening agents, etc.

For purposes of electrocoating compositions, the electrocoating bath can be prepared according to the procedure disclosed and claimed in copending application, Ser. No. 424,550, filed Jan. 11, 1965. This later copending application described a "separate entity" technique according to which pigment (and/or filler) and vehicle (or binder) paint components are separately prepared as dispersions of solids and admixed or brought together only in the presence of sufficient bath diluent to disperse these components to the low bath concentrations desired for electrocoating (generally, 5 to 35 weight percent total non-volatile solids). That is, the pigment and vehicle components are not brought together to form a paint, in the conventional sense, as a preliminary step to the preparation of the bath. Rather, the pigment and vehicle components are maintained as "separate entities" until they are added singly to the bath diluent, with agitation of the diluent during such addition. As such, there never is a high concentration of pigment and vehicle solids in the same formulation.

In using the vehicles of this invention in electrocoating, the paints are prepared by admixing the resin blend and pigment to obtain a pigment volume concentration of about 0.1 to 25 weight percent, preferably about 1 to 15 weight percent. The pigmented mixture can be diluted with water (either tap water or, preferably, deionized water) to yield baths having 1 to 35, preferably 5 to 15, weight percent non-volatile solids. Electrocoating of metal surfaces or other electrically conductive objects can be carried out by conventional techniques with such baths, for example, by making the object to be coated the anode of a D.C. electrical circuit and using a metal tank to hold the bath and serve as the cathode. The voltage of the system can be 50 to 1000 volts, using amperages of 0.1 to 10 amps per square foot of immersed electrode surface and conductivities of 100 to 3000 ohm$^{-1}$/cm. Electrocoating conditions can be chosen to provide coating with desirable, serviceable thicknesses, e.g., 0.5 to 2 mils, preferably 0.7 to 1.5 mils. The surfaces or articles which can be electrocoated with the vehicles of this invention include any of those which are sufficiently electrically conductive, such as steel, galvanized steel, phosphate-coated steel, aluminum, tin, copper, iron, zinc, etc., the nature of the surface or article determining what voltage and other electrocoating conditions should be used to obtain optimum results, these conditions being determined by simple routine tests known in the art. After electrocoating the article, the coated article can be rinsed with water and passed to a stoving area where the coating is cured, for example, 20 minutes at a temperature of 350° F.

The objects and advantages of this invention are further illustrated by the following examples, but it should be understood that the various materials and amounts, the conditions of reaction, and other details used in these examples should not be construed to unduly limit this invention. In these examples, "parts" mean parts by weight.

EXAMPLE I

This example illustrates the invention when 70% of the theoretical amount of aniline needed to react with the anhydride groups of the adduct is used.

A reactor was charged with 2400 parts of a modified drying oil comprising a copolymer of 80 wt. percent linseed oil and 20 wt. percent cyclopentadiene. 296 parts maleic anhydride were added to the charged oil and the mixture was heated to about 400° F. and held there for 4 hrs. to form the adduct. Heating was discontinued, and 1155 parts of tertiary butanol, a polar solvent, were added when the reaction had cooled to 180° F.

1,500 parts of the resin product were charged to a reactor and heated to 150° F. At this temperature, 76.6 parts aniline were charged to the heated resin solution and the reaction was continued at this temperature for 1 hr. The amount of aniline added was equal to 70% of the theoretical amount of aniline which could have reacted with the adduct. The resulting resin solution had an acid number of 56.8, a non-volatile solids content of 69.5 wt. percent, and a viscosity of 99.0 stokes. After the acidity had been determined, diisopropanolamine in an amount equal to 60% of the theoretical amount required to neutralize the acidity in the resin solution was added to further neutralize the product so that the resin solution would be water-soluble. This dispersion was immediately diluted with sufficient water to provide an electrocoating bath having 6 wt. percent non-volatile solids and a pH of 8.6.

The electrocoating bath was then used to coat a plurality of Bonderite 37 test panels (4" x 6" of 20-gauge steel precoated with zinc phosphate) at a preset direct current. The so-coated panels were withdrawn from the bath in each case, rinsed with tap water and baked at about 380° F. for 10 minutes. In each electrocoating run, after the panels were fully immersed in the bath to the desired extent, the initial amperage was recorded and, thereafter, amperages at 15, 30 and 60 seconds were recorded. The thickness of the deposition in mils was measured, and the appearance of the film was noted and recorded.

The apparatus used in carrying out the electrocoating operation was a 1-gal., tin-plated steel can, into which the test panel was lowered until about ¾ of the panel was immersed in the bath, and after 1 min., the panel was withdrawn. The can was grounded and served as a cathode while the hanger from which each panel depended was connected to the positive pole of the source, so that the panel served as the anode of the electric circuit.

Electrocoating data and the results obtained are summarized in Table I.

TABLE I

|  | Run 1 | Run 2 | Run 3 | Run 4 |
|---|---|---|---|---|
| EMF setting | 200 | 300 | 400 | 500 |
| Initial voltage | 182 | 280 | 370 | 460 |
| Final voltage | 190 | 290 | 390 | 490 |
| Initial amps | 0.19 | 0.25 | 0.30 | 0.36 |
| 15 second amps | 0.10 | 0.09 | 0.10 | 0.08 |
| 30 second amps | 0.06 | 0.07 | 0.06 | 0.06 |
| Final amps | 0.05 | 0.05 | 0.05 | 0.04 |
| Thickness of deposition (mils) | 0.25 | 0.50 | 0.75 | 0.95 |

The throwing power of the above-described electrocoating painting bath was also evaluated by immersing in the bath a ⅜ I.D. steel tube with a 20-gauge steel strip of metal diametrically inserted in the tube. After such immersion, the tube and strip were electrocoated for 15 secs. with a preset field of 300 volts. The distance that the deposited film extended from the mouth of the tube was recorded, and for varying EMF settings, this distance in cms. represented the throwing power.

The data of Table I show that the vehicle of this invention had excellent high voltage capability, as evidenced by the increased moderate thickness of the deposition and the moderate amperages obtained at the progressively increased EMF settings. Further, the fact that rupture did not occur until an EMF setting of 600 volts indicates excellent high voltage capability. Low voltage capability was indicated by the moderately thick deposition at an EMF setting of 200 volts. The depositions obtained with this vehicle were generally smooth and glossy in appearance, especially those at EMF's of 400 and 500. All of the panels which were coated with this electrocoating bath showed an excellent wash-off capability, indicating that the drag-out, if any, was easily washable and thus presented no significant problems.

The throwing power was measured at an EMF of 300 volts and was found to be 5 cms., a very good throwing power at this voltage.

EXAMPLE II

This example illustrates the present invention when 70% of the theoretical amount of o-toluidine required to react with the anhydride groups of the adduct is used.

The reactor was charged with 1200 parts of a modified drying oil comprising a copolymer of 80 wt. percent linseed oil and 20 wt. percent cyclopentadiene. 147 parts maleic anhydride were added to the charged oil, and the mixture was heated to about 400° F. and held there for 2 hrs. and 40 min. to form the adduct. Heating was discontinued and 570 parts of tertiary butanol, a polar solvent, were added when the reaction had cooled to 180° F. The reactor containing the adduct solution was charged with 113 parts o-toluidine and held at a temperature of 150° F. for 1 hr. The resulting resin solution had a non-volatile solids content of 68.8 wt. percent, a viscosity of 126 stokes, and an acid number of 56.2. After the acidity was determined, diethanolamine in an amount equal to 40% of the theoretical amount required to neutralize the acidity in the resin solution was added to further neutralize the product so that one resin solution would be water soluble. This dispersion was immediately diluted with sufficient water to provide an electrocoating bath having a non-volatile solids content of 6 wt. percent.

The bath was then evaluated, using the electrocoating apparatus and technique of Example I. Electrocoating data for the evaluations are set forth in the following table.

TABLE II

|  | Run 1 | Run 2 | Run 3 |
|---|---|---|---|
| EMF setting | 300 | 400 | 500 |
| Initial voltage | 280 | 370 | 460 |
| Final voltage | 295 | 390 | 490 |
| Initial amps | 0.23 | 0.26 | 0.35 |
| 15 second amps | 0.08 | 0.08 | 0.10 |
| 30 second amps | 0.05 | 0.05 | 0.06 |
| Final amps | 0.04 | 0.04 | 0.04 |
| Thickness of deposition (mils) | 0.4 | 0.5 | 1.0 |

The throwing power was also evaluated by the apparatus and technique of Example I. As evidenced by the results at EMF settings of 300, 400 and 500 volts, the vehicle showed a very good high voltage capacity. In general, the depositions were smooth and glossy at all EMF settings. The throwing power of this resin system was found to be 7.0 cm. at an EMF setting of 500 volts. This, of course, is an excellent throwing power.

EXAMPLE III

This example illustrates the resin system of the present invention when 95% of the theoretical amount of aniline required to react with the anhydride groups is used.

An adduct solution in tertiary butanol was prepared as in Example I and, at 150° F., was reacted with 104 parts aniline and held for 1 hr., the amount of aniline being 95% of the theoretical amount required to react with the adduct. The resulting solution had a non-volatile solids content of 68.8%, a viscosity of 120 stokes and an acid number of 56.8. The resin solution was not water soluble. After the acidity was determined, 60% of the amount of diisopropanol amine required to react with the acidity in the resin solution was added to the solution to produce a water-soluble resin vehicle. This resin vehicle was diluted immediately with sufficient water to provide an electrocoating bath having a non-volatile solids content of 6 wt. percent and a pH of 8.6. The bath was then evaluated using the electrocoating apparatus and technique of Example I. Electrocoating data for the evaluations are set forth in the following table.

TABLE III

| Panel | 1 | 2 | 3 | 4 | 5 | 6 |
|---|---|---|---|---|---|---|
| EMF setting | 100 | 200 | 300 | 400 | 500 | 600 |
| Initial voltage | 92 | 185 | 275 | 368 | 460 | 555 |
| Final voltage | 98 | 192 | 290 | 385 | 485 | 580 |
| Initial amps | 0.13 | 0.25 | 0.26 | 0.30 | 0.35 | 0.37 |
| 15 second amps | 0.07 | 0.11 | 0.10 | 0.10 | 0.10 | 0.11 |
| 30 second amps | 0.06 | 0.09 | 0.08 | 0.09 | 0.09 | 0.09 |
| Final amps | 0.05 | 0.06 | 0.05 | 0.06 | 0.06 | 0.06 |
| Thickness of deposition (mils) | 0.30 | 0.75 | 0.48 | 0.55 | 0.85 | 0.90 |

The throwing power was also evaluated by the apparatus and technique of Example I. As evidenced by the results at EMF settings of 400, 500 and 600 volts, the vehicle showed a very good high voltage capability. In general, the depositions at EMF's of 400 to 600 were smooth, glossy, showed little or no orange peel, and were very even. The throwing power was found to be 4.4 cms. at an EMF of 300 volts and 5.6 cms. at an EMF of 500 volts; thus, the bath had excellent throwing power.

The corrosion resistance of Panel 5 of Table III was then evaluated by the salt-spray technique. In this corrosion test, the uncoated ⅙ of the panel was dipped into a solvent-thinned air-dry primer to protect the baked, coated area, during the subsequent salt-spray exposure, from any corrosion which might otherwise migrate from uncoated areas during the course of the salt-spray test. Two 9″ lines were scored on one side of the panel in the form of an X. The scored panel was then placed in a rack so that it was at an angle of 15° from the vertical, with ⅙ portion of the panel forming the lower end. The rack with the panel loaded in it was then placed in a salt-spray cabinet where it was sprayed with a 5% aqueous salt solution at 90°–95° F. After 238 hrs. of such exposure, the panel was removed from the salt-spray cabinet, rinsed with water and patted dry with paper towels. Masking tape, 1″ in width, was placed firmly over one of the legs of the X and then ripped or pulled back rapidly at 180°, the placing of this tape and its removal occurring within 5 min. after the panel was removed from the salt-spray cabinet. Upon examining the panel after the tape was removed, it was found that where coating was removed with the tape, the removed coating extended less than $\frac{1}{16}$ of an inch from the scored line. This minimal removal of coating, or minimum "creep," showed the good adhesion the coating had for the panel and its desirable corrosion resistance. Other coated or unscored portions of the panel which were exposed to the salt-spray had only insignificant areas of rust and did not have evidence of blistering or other imperfections.

EXAMPLE IV

A portion of the reaction product of aniline and adduct obtained in Example III was isolated and placed in a container. 40% of the amount of diethanol amine required to react with the acidity in the resin solution was added to the solution. This dispersion was immediately diluted to provide an electrocoating bath having a pH of 8.7, and a non-volatile solids content of 6 wt. percent. This bath was evaluated as in Example I and the results are reported below in Table IV. The throwing power was also measured as in Example I and determined to be 5.6 cms. at 300 volts. This, of course, is a good throwing power.

TABLE IV

|  | Run 1 | Run 2 | Run 3 | Run 4 |
|---|---|---|---|---|
| EMF setting | 200 | 300 | 400 | 500 |
| Initial voltage | 185 | 280 | 350 | 460 |
| Final voltage | 195 | 290 | 385 | 480 |
| Initial amps | 0.15 | 0.22 | 0.35 | 0.40 |
| 15 second amps | 0.05 | 0.11 | 0.11 | 0.10 |
| 30 second amps | 0.04 | 0.09 | 0.06 | 0.07 |
| Final amps | 0.03 | 0.05 | 0.04 | 0.05 |
| Thickness of deposition (mils) | 0.35 | 0.60 | 0.70 | 0.90 |

The data of Table IV indicate that the resin vehicle had a very good high voltage capability, since moderately thick depositions were obtained at EMF's of 400 and 500, and reasonable amperages were also recorded at these EMF's. A good low voltage capability was also recorded, as indicated by the data. The depositions were, in general, very smooth and very even. Scattered water spots were noted at the higher EMF's, although, in general, the deposition was excellent in all 4 runs. The wash-off was medium to good, indicating that the drag-out, if any, was removed in good quantities by washing.

EXAMPLE V

A reactor was charged with 1200 parts of a modified drying oil comprising a copolymer (Admerol 75) of 80 wt. percent linseed oil and 20 wt. percent cyclopentadiene. To the charged oil were added 148 parts maleic anhydride. The mixture was heated to about 400° F. and held at or near that temperature for about 4 hrs. to form the maleic adduct. Heating was then discontinued and the reaction was cooled to 300° F., at which time 578 parts tertiary butanol were added to stop the viscosity increase and thereby quench the reaction. The diluted solution was divided into 2 parts, A and B. 800 parts of solution A were cooled to 150° F. To the cooled solution were added 29.3 parts aniline, the amount of aniline being 50% of the theoretical amount required to react with the anhydride adduct. The temperature was held at 150° F. for 1 hr. The resulting resin solution had an acid number of 57.0, a non-volatile solids content of 69.2 and a viscosity of 66.2 stokes and was not water-soluble since no amine salt had formed, as determined by the infrared spectrum.

After the acidity had been determined as above, 40% of the amount of diethanol amine required to neutralize said acidity was added to the resin solution to produce a water-soluble vehicle dispersion. This dispersion was immediately diluted with water to give an electrocoating bath having a non-volatile solids content of 6 wt. percent. The bath (A) was then evaluated by the electrocoating apparatus and procedures outlined in Example I, and the results of this evaluation are recorded below in Table V. The other 800 parts of the diluted solution (B) were also cooled to 150° F., and to this cooled solution were added 14.6 parts aniline, the amount of aniline being about 25% of the theoretical amount required to react with the anhydride adduct. The temperature was held at 150° for 1 hr., and the resulting solution had an acid number of 58.4, a non-volatile solids content of 69.5 and a viscosity of 37.8 stokes. After the acidity of this solution was determined, 40% of the amount of diethanol amine required to react with said acidity was added to produce a vehicle dispersion. Sufficient water was immediately added to this vehicle dispersion to produce an electrocoating bath having a non-volatile solids content of 6. This bath (B) was also evaluated using the electrocoating apparatus and technique of Example I. Data for these evaluations are also set forth in Table V.

TABLE V

|  | Bath A | | | | Bath B | |
|---|---|---|---|---|---|---|
|  | Run 1 | Run 2 | Run 3 | Run 4 | Run 1 | Run 2 |
| EMF setting | 300 | 400 | 500 | 600 | 300 | 500 |
| Initial voltage | 280 | 370 | 465 | 555 | 250 |  |
| Final voltage | 290 | 388 | 490 | 590 | 298 |  |
| Initial amps | 0.15 | 0.24 | 0.30 | 0.33 | 0.52 |  |
| 15 second amps | 0.06 | 0.06 | 0.07 | 0.06 | 0.01 |  |
| 30 second amps | 0.05 | 0.05 | 0.04 | 0.05 | 0.00 |  |
| Final amps | 0.03 | 0.03 | 0.02 | 0.03 | 0.00 |  |
| Thickness of deposition (mils) | 0.45 | 0.60 | 0.90 | 1.1 | 0.00 |  |

The film deposited from Bath A showed high voltage capability, as evidenced by the increased moderate thickness of the deposition and the moderate amperages obtained in the progressively higher EMF settings. In general, the films were glossy and very even. At 600 volts, a fine orange peel and a few water spots were noted, but the film was otherwise favorable. Some gassing and water spots were also noted at the EMF's of 300 and 400; however, the films at these EMF settings were generally satisfactory. The throwing power was evaluated by the procedure outlined in Example I and found to be 3.9 cms. at 300 volts and 6.2 cms. at 600 volts. Since the film had an excellent high voltage capability, the throwing power at 600 volts is the more accurate value.

The attempted electrocoat evaluation with Bath B was, as shown in the table, a failure. No amperage reading was obtained after 30 seconds, and no adhesion whatsoever was noted. Thus, when the adduct is reacted with only 25% of the amount of aniline which could theoretically react with the adduct, the vehicle obtained cannot be used effectively in electrocoating.

EXAMPLE VI

The acidity of a portion of vehicle dispersion A prepared in Example V above was determined and 60% of the amount of diisopropanol amine required to react with said acidity was added to the dispersion to produce a water-soluble vehicle. After the addition of the diisopropanol amine, this dispersion was diluted immediately with sufficient water to produce a bath having a non-volatile solids content of 6 wt. percent and a conductivity of 261. This bath was then evaluated as an electrocoating bath using the apparatus and technique of Example I. Data for the evaluations are set forth in the following table.

TABLE VI

|  | Run 1 | Run 2 | Run 3 | Run 4 |
|---|---|---|---|---|
| EMF setting | 100 | 300 | 400 | 500 |
| Initial voltage | 90 | 280 | 365 | 460 |
| Final voltage | 95 | 295 | 390 | 490 |
| Initial amps | 0.14 | 0.22 | 0.32 | 0.38 |
| 15 second amps | 0.05 | 0.08 | 0.10 | 0.10 |
| 30 second amps | 0.04 | 0.05 | 0.06 | 0.06 |
| Final amps | 0.03 | 0.04 | 0.04 | 0.04 |
| Thickness of deposition (mils) | 0.09 | 0.35 | 0.60 | 0.75 |

The data of Table VI show excellent high voltage capability in regard to the 400 and 500 EMF settings and excellent low voltage capability, especially with regard to the 100 EMF setting. The deposition was excellent at all EMF settings, especially at the higher settings. In general, the films were glossy and smooth, and the thickness of the films was very even. Since no rupture was produced, the films possibly could be evaluated at even higher EMF's. The throwing power of the bath was also evaluated and found to be 3.7 cms. at 300 volts and 4.4 cms. at 500 volts. These are acceptable throwing powers.

EXAMPLE VII

The reactor was charged with 1200 parts of modified drying oil comprising a copolymer (Admerol 75) of 80 wt. percent linseed oil and 20 wt. percent cyclopentadiene. To the charged oil was added 148 parts maleic anhydride. The mixture was then heated to about 400° F. and held at this temperature for about 3½ hrs. to form the maleic adduct. Heating was then discontinued, and the reaction was cooled to 180° F. At this temperature, 634 parts of tertiary butanol were added to cool the reaction and stop the viscosity increase. After 45 min., when the temperature had decreased to 150° F., 128 parts of mixed xylidines were added over a period of 1 hr. and 5 min. The solution thus produced had a non-volatile solids content of 67.2 wt. percent, a viscosity of 61 stokes and an acid number of 56.4. 40% of the amount of diethanol amine required to react with the acidity in the solution was added to produce a resin vehicle dispersion. This dispersion was diluted immediately to produce an electrocoating bath having a non-volatile solids content of 6 wt. percent, a conductivity of 239, and a pH of 8.75. The bath had the consistency of a smooth oil-in-water emulsion. The bath was then evaluated using the electrocoating apparatus and technique of Example I and the data for the evaluations are set forth in the following table.

TABLE VII

|  | Run 1 | Run 2 | Run 3 |
|---|---|---|---|
| EMF setting | 300 | 400 | 500 |
| Initial voltage | 279 | 365 | 455 |
| Final voltage | 290 | 385 | 490 |
| Initial amps | 0.25 | 0.34 | 0.35 |
| 15 second amps | 0.08 | 0.10 | 0.07 |
| 30 second amps | 0.06 | 0.06 | 0.05 |
| Final amps | 0.04 | 0.04 | 0.02 |
| Thickness of deposition (mils) | 0.45 | 0.80 | 0.92 |

The data in Table VII indicate that the bath had a high voltage capability, indicated by the progressively increasing film thicknesses and moderate amperages. Further, the films obtained were very smooth and glossy, showing only scattered water spots and little or no roughness. The deposition was regarded as excellent and the wash-off as very acceptable. The throwing power was evaluated and was found to be 5.5 cms. at 300 volts, a very excellent throwing power.

EXAMPLE VIII

This example illustrates the present invention when 70% of the theoretical amount of methyl aniline (a secondary aromatic amine) required to react with the anhydride groups of the adduct is used. The reactor was charged with 1185.8 parts of a modified drying oil comprising a copolymer of 80 wt. percent linseed oil and 20 wt. percent cyclopentadiene. 146.2 parts maleic anhydride were added to the charged oil, and the mixture was heated to about 400° F. and held there for 2 hrs. and 30 min. The temperature was then increased to 430° F. and held there for an additional 2 hrs. to form the adduct. Heating was discontinued and 544 parts tertiary butanol were added when the reaction had cooled to 180° F. The reactor containing the adduct solution was then charged with 112 parts methyl aniline and held at a temperature of 160° F. for 50 min. The resulting resin solution had a non-volatile solids content of 66.4 wt. percent, a viscosity of 45 stokes and an acid number of 56.2. After the acidity was determined, 40% of the theoretical amount of diethanol amine required to completely neutralize the acidity in the resin solution was added to further neutralize the product so that the resin solution would be water-soluble. This dispersion was immediately diluted with sufficient water to provide an electrocoating bath having a non-volatile solids content of 6 wt. percent.

The bath was then evaluated, using the electrocoating apparatus and technique of Example I. Electrocoating data are set forth below in Table VIII.

TABLE VIII

|  | Run 1 | Run 2 | Run 3 |
|---|---|---|---|
| EMF setting | 100 | 200 | 300 |
| Initial voltage | 177 | 260 | 85 |
| Final voltage | 193 | 280 | 94 |
| Initial amps | 0.39 | 0.55 | 0.28 |
| 15 second amps | 0.14 | 0.25 | 0.13 |
| 30 second amps | 0.10 | 0.17 | 0.08 |
| Final amps | 0.06 | 0.12 | 0.04 |
| Thickness of deposition (mils) | 0.8 | 1.35 | 0.6 |

The throwing power was also evaluated by the apparatus and technique of Example I. As evidenced by the results at EMF settings of 100, 200 and 300, the resin vehicle showed an acceptable low voltage capacity. In general, the depositions were smooth and glossy at the EMF's reported. The throwing power was found to be 2 cm. at an EMF of 150 volts.

EXAMPLE IX

A resin solution as produced in Example III was diluted with mineral spirits to give an 80 wt. percent solution. 1500 parts of this solution were charged to a reactor and heated to 140° F. The heating was discontinued and 120 parts of cyclohexyl amine were added slowly for 15 min. The reaction thus obtained was exothermic and pushed the temperature to about 200° F., at which temperature 260 parts of Cellosolve were added. The resulting product had a non-volatile solids content of 69.6%, a viscosity of 99 stokes and an acid number of 53.4 as determined by a KOH titration. To this solution was added 60% of the amount of diisopropanol amine required to fully neutralize the acidity. The resulting dispersion was diluted immediately with sufficient water to produce a bath having a solids content of 6%, a conductivity of 269, and a pH of 9.2. The bath was then evaluated using the electrocoating apparatus and technique of Example I. Data for the evaluations are set forth in the following Table.

TABLE IX

|  | Run 1 | Run 2 | Run 3 | Run 4 |
|---|---|---|---|---|
| EMF setting | 100 | 200 | 300 | 400 |
| Initial voltage | 91 | 178 | 270 | 340 |
| Final voltage | 98 | 191 | 0.50 | ------ |
| Initial amps | 0.20 | 0.35 | 0.50 | 0.94 |
| 15 second amps | 0.07 | 0.11 | 0.18 | rupture |
| 30 second amps | 0.05 | 0.10 | 0.13 | ------ |
| Final amps | 0.04 | 0.06 | 0.10 | ------ |
| Thickness of deposition (mils) | 0.2 | 0.6 | 1.1 | ------ |

The data in Table IX indicate that the bath obtained from the polycarboxylic acid anhydride resin reacted with cyclohexylamine did not have acceptable electrocoating properties. This was indicated by the poor high voltage capability (rupture at 400 volts) and by the unacceptable low voltage capability (lots of gassing was noted at 100 volts). The films produced by the electrocoating were poor in that gassing, orange peel, no gloss, and sagging were noted. The throwing power was evaluated and found to be only 2.0 cm. at 300 volts. This is not an acceptable throwing power for electrocoating baths.

EXAMPLE X

The reactor was charged with 1037 parts of a modified drying oil comprising a copolymer (Admerol 75) of 80 wt. percent linseed oil and 20 wt. percent cyclopentadiene. To the charged oil were added 128 parts maleic anhydride. The mixture was then heated to about 400° F. and held at this temperature for about 3½ hrs. to form the maleic adduct. Heating was discontinued, and the reaction was cooled to 178° F., at which time 480 parts of tertiary butanol were added. By this addition, the reaction was cooled to 140° F. over a 1½ hr. period. To the resin solution thus obtained, 82 parts of aniline were added and the temperature was held below 180° F. for 1 hr. The product from the aniline addition had an acid value of 55.9, a non-volatile solids content of 69.2 wt. percent, and a viscosity of 162 stokes.

The resin solution was divided into two portions, A and B. To portion A was added 40% of the amount of diethanol amine required to completely neutralize the acidity of the solution. This dispersion was diluted immediately with sufficient water to provide an electrocoating bath having a solids content of 6 wt. percent, conductivity of 272, and a pH of 8.7. This was called Electrocoating Bath A.

To resin solution B was added 60% of the amount of diisopropanol amine required to completely neutralize the acidity of the solution. The resulting vehicle dispersion was diluted immediately with sufficient water to provide an electrocoating bath (B) having a solids content of 6 wt. percent, conductivity of 230, and a pH of 8.9.

The two baths were then evaluated using the electrocoating apparatus and technique of Example I. The data for the evaluations are set forth in the table below.

TABLE X

|  | Bath A | | | | Bath B | | | |
|---|---|---|---|---|---|---|---|---|
|  | Run 1 | Run 2 | Run 3 | Run 4 | Run 5 | Run 6 | Run 7 | Run 8 |
| EMF setting | 300 | 400 | 500 | 600 | 300 | 400 | 500 | 600 |
| Initial voltage | 280 | 370 | 465 | 555 | 280 | 370 | 460 | 560 |
| Final voltage | 292 | 388 | 485 | 580 | 295 | 390 | 490 | 580 |
| Initial amps | 0.25 | 0.25 | 0.30 | 0.38 | 0.20 | 0.24 | 0.30 | 0.35 |
| 15 sec. amps | 0.08 | 0.08 | 0.08 | 0.07 | 0.07 | 0.07 | 0.06 | 0.09 |
| 30 sec. amps | 0.06 | 0.06 | 0.06 | 0.05 | 0.05 | 0.05 | 0.05 | 0.06 |
| Final amps | 0.04 | 0.04 | 0.04 | 0.04 | 0.03 | 0.03 | 0.03 | 0.04 |
| Thickness of deposition (mils) | 0.20 | 0.25 | 0.50 | 0.85 | 0.21 | 0.30 | 0.40 | 0.65 |

The data indicate that both baths produced films having an excellent wash-off, showing that the drag-out was either eliminated or rendered easily washable. In general, the results of Bath A were good, especially at the high EMF's. At the low EMF's, slight gassing and absence of glossiness were noted as being the only bad properties of an otherwise acceptable film. Medium orange peel was noted at EMF's of 500 and 600. In general, however, the films produced in all runs were very good. The throwing power of Bath A was determined and found to be 4.8 cm. at 300 volts and 6.3 cm. at 500 volts.

The data indicate also that Bath B provided a very good film and that the drag-out, if any, was easily washed off. Medium orange peel was noted at EMF's of 400, 500 and 600, but, in general, very smooth and glossy films were noted. An overall good flow indicated that the depositions were quite acceptable for electrocoating. The throwing power of Bath B was evaluated and found to be 6 cm. at 400 volts and 4.3 cm. at 300 volts.

EXAMPLE XI

A reactor was charged with 1185.8 parts of a modified drying oil comprising a copolymer (Admerol 75) of 80 wt. percent linseed oil and 20 wt. percent cyclopentadiene. The reactor containing the oil was also charged with 146.2 parts of maleic anhydride and 26 parts of diethyl Carbitol (diethyl ether of diethanol glycol). The reaction mixture was heated to 380° F. and held at this temperature for about 6 hr. Heating was then discontinued and the reaction was cooled to 180° F., at which temperature 544.8 parts of tertiary butanol were added over a 15 min. period. The addition of the butanol cooled the reaction mixture to 150° F. To the resin solution were added 130 parts morpholine, said amount of morpholine being equal to 50% of the theoretical amount which could react with the anhydride in the resin solution. During the morpholine addition, the reaction was cooled with air. The reaction was held at about 150–170° F. for ½ hr.

The resulting resin solution had a non-volatile solids content of 71.7, a viscosity of 205 stokes, and an acid number of 54.

Since a salt had formed in the resin solution, no further amine was required to make the solution water soluble. The vehicle dispersion was diluted immediately with sufficient water to produce a bath having a non-volatile solids content of 6%, a pH of 7.4 and a conductivity of 356.

The bath was evaluated using the electrocoating techniques and apparatus of Example I. Data for the evaluations are set forth in Table XI which follows:

TABLE XI

|  | Run 1 | Run 2 |
|---|---|---|
| EMF setting | 100 | 200 |
| Initial voltage | 91 | 180 |
| Final voltage | 95 | 190 |
| Initial amps | 0.18 | 0.30 |
| 15 second amps | 0.08 | 0.24 |
| 30 second amps | 0.06 | 0.23 |
| Final amps | 0.05 | 0.10 |
| Thickness of deposition (mils) | 0.8 | 1.5 |

The data of Table XI indicate that the electrocoating bath produced poor depositions at the low EMF settings of 100 and 200. The films showed bumps and specks and heavy sagging. Since the heavy sagging was noted at an EMP setting of 200, higher EMF's would cause the film not to adhere at all. The throwing power was evaluated and found to be 2.8 cm. at 300 volts. Of course, this is a very low and unacceptable throwing power.

EXAMPLE XII

The reactor was charged with 1520 parts of linseed oil, 25 parts of xylene and 480 parts of maleic anhydride. The contents of the reactor were then heated to 408° F. over a period of 3 hr. and 35 min. to form a maleic adduct. Heating was then discontinued and the reaction was cooled to room temperature. 200 parts of a 28% ammonia solution and 2300 parts deionized water were added to 1500 parts of the maleic adduct. The mixture was heated to 130° F. and held for 1 hr., at which time an additional 690 parts deionized water were added. The resin solution thus produced had a non-volatile solids content of 32.2 wt. percent, a pH of 6.2, and a non-volatile acid value of 172.0.

The resin dispersion was then diluted with sufficient deionized water to produce an electrocoating bath having a non-volatile solids content of 6 wt. percent and a pH of 6.7. No further neutralization of the resin was required; thus amine salt formation had occurred. The bath was then evaluated using the electrocoating apparatus and technique of Example I, and the data for the evaluations are set forth in the following table:

TABLE XII

|  | Run 1 | Run 2 | Run 3 |
|---|---|---|---|
| EMF setting | 50 | 100 | 150 |
| Initial voltage | 25 | 50 | rupture |
| Final voltage | 30 | 65 | rupture |
| Initial amps | 0.60 | 1.12 | rupture |
| 15 second amps | 0.40 | 0.65 | rupture |
| 30 second amps | 0.37 | 0.57 | rupture |
| Final amps | 0.34 | 0.54 | rupture |
| Thickness of deposition (mils) | 0.40 | 0.60 | rupture |

The data of Table XII indicate that the bath had very poor high and intermediate voltage capacity, since rupture occurred at an EMF of 150 volts. The films produced at EMF's of 50 and 100 were smooth and very hard. The film was tested by the salt-spray technique of Example III and was found to fail after only 250 hrs.

As used in this application, the term "acid value" (or "acid number") means the analytical value indicative of the free acid and/or acid anhydride in a system as determined according to Gardner & Sward's Paint Testing Manual, 12th ed., 1962, p. 425, which procedure follows essentially that of ASTM D 555; the term represents the number of milligrams of KOH required to neutralize the acidity of a 1-gram sample of non-volatile solids. Where the weight percent of non-volatile solids of a system is recited, this value is determined according to Method B on p. 505 of said Manual by placing 0.5 g. of sample in a 100 mm. diameter aluminum dish, diluting the same with 1-2 ml. of a solvent such as benzene, heating the sample on a hot plate (150° C.) for 30 min., cooling, weighing the non-volatile residue, subtracting this weight from that of the sample, and multiplying the remainder by 100. The term "iodine value" (or "iodine number") means the analytical value indicative of the unsaturation of a system as determined according to pp. 428–429 of said Manual, and represents the percent of iodine which will react with an unsaturated material. Where the viscosity of a system is recited, in terms of stokes, the viscosity measurement is determined according to the Gardner-Holdt bubble viscometer procedure described on p. 171 of said Manual. The term "hydroxyl value" (or "hydroxyl number") means the analytical value determined according to p. 433 of said Manual and represents the amount of hydroxyl groups in a system. Where reference is made to the use of mineral spirits to adjust the non-volatile solids content of a polycarboxylic acid resin product for purposes of determining or specifying the viscosity of such product, regular mineral spirits are used (such as supplied by American Mineral Spirits Co.) having an aniline point of 53–59° C., a flash point (TCC) minimum of 100° F., and the following distillation: initial boiling point, 310° F. min.; 50 percent, 331° F. min.; 90 percent, 380° F. max.; and end point, 375–395° F.

Various modifications and alterations of this invention will become apparent to those skilled in the art without departing from the scope and spirit of this invention, and it should be understood that this invention should not be limited unduly to that set forth herein for illustrative purposes.

I claim:

1. A water-disperible resinous coating composition prepared by:
   reacting at a temperature between about 250 to 500° F. from about 5 to 45 parts by weight of an $\alpha,\beta$-ethylenically unsaturated dicarboxylic acid anhydride or half-ester thereof and correspondingly from 95 to 55 parts of a drying oil or copolymers thereof with an alicyclic conjugated diene having 5 to 8 ring carbon atoms, to form an adduct,
   reacting said adduct with an aromatic amine in a molar ratio of from 1:0.4 to 1:1, respectively, at a temperature of from about 50 to 200° F. to provide a salt-free partially amidated product exhibiting a viscosity of from 15 to 300 stokes as determined for a 70% by weight solution of said product in tertiary butanol,
   neutralizing from 30 to 80% of the free carboxyl groups of said partially amidated product with an alkanolamine.

2. A composition in accordance with claim 1 wherein said aromatic amine is a primary or secondary monoamine having from 1 to 20 carbon atoms.

3. A composition in accordance with claim 2 wherein said alkanolamine is a monohydroxy alkanol having from 1 to 5 carbon atoms.

4. A composition in accordance with claim 3 wherein said aromatic monoamine is selected from the group consisting of aniline, xylidine and toluidine.

5. A composition in accordance with claim 4 wherein said dicarboxylic acid anhydride is a maleic anhydride.

6. A composition in accordance with claim 5 wherein the oil copolymer comprises 50 to 95 parts linseed oil and correspondingly from 50 to 5 parts of cyclopentadiene.

References Cited

UNITED STATES PATENTS

| 3,098,834 | 7/1963 | Jerabek | 260—23.7 |
| 3,366,563 | 1/1968 | Hart et al. | 204—181 |

DONALD E. CZAJA, Primary Examiner.

R. A. WHITE, Assistant Examiner.

U.S. Cl. X.R.

260—29.7, 41.5, 404.8; 106—252; 204—181